United States Patent
Walden

(10) Patent No.: US 8,999,234 B2
(45) Date of Patent: Apr. 7, 2015

(54) MOISTURE AND ULTRAVIOLET LIGHT BARRIER COMPOSITION

(71) Applicant: David Walden, Wildwood, MO (US)

(72) Inventor: David Walden, Wildwood, MO (US)

(*) Notice: Subject to any disclaimer, the term of this patent is extended or adjusted under 35 U.S.C. 154(b) by 35 days.

(21) Appl. No.: 13/839,549

(22) Filed: Mar. 15, 2013

(65) Prior Publication Data

US 2013/0251589 A1  Sep. 26, 2013

Related U.S. Application Data

(60) Provisional application No. 61/649,014, filed on May 18, 2012, provisional application No. 61/613,731, filed on Mar. 21, 2012.

(51) Int. Cl.
| | |
|---|---|
| C23F 11/00 | (2006.01) |
| B08B 9/00 | (2006.01) |
| C09K 3/00 | (2006.01) |
| C04B 9/02 | (2006.01) |
| C09D 5/08 | (2006.01) |
| C09D 191/00 | (2006.01) |
| C09D 191/06 | (2006.01) |

(52) U.S. Cl.
CPC .............. C09D 5/08 (2013.01); C09D 191/00 (2013.01); C09D 191/06 (2013.01); *C08L 2205/02* (2013.01)

(58) Field of Classification Search
CPC .......... B08B 9/00; C23F 11/00; C23F 14/00; C23F 15/00
USPC ............... 422/1, 7; 134/22.1; 252/380, 387; 106/14.05, 14.34, 18.29, 660
See application file for complete search history.

(56) References Cited

U.S. PATENT DOCUMENTS

| | | |
|---|---|---|
| 4,606,945 A | 8/1986 | Itoh et al. |
| 5,221,490 A | 6/1993 | Tajiri et al. |
| 5,938,210 A | 8/1999 | Schatzle |
| 2004/0156995 A1 | 8/2004 | Komiyama et al. |
| 2007/0207186 A1* | 9/2007 | Scanlon et al. ............... 424/424 |
| 2010/0202984 A1* | 8/2010 | Langhals et al. ............. 424/59 |

FOREIGN PATENT DOCUMENTS

EP  0 837 156 A1  10/1998

OTHER PUBLICATIONS

"Glycerol Monooleate," http://chemicalland21.com/lifescience/foco/GLYCEROL%20MONO . . . , printed on May 12, 2011, four pages.
"Polyglycerol Esters of Fatty Acids," 35th JECFA, 1989, two pages.
"Fats, Oils, Fatty Acids, Triglycerides," Scientific Psychic, http://www.scientificpsychic.com/fitness/fattyacids1.html, printed on May 12, 2011, 12 pages.
"Rust Prevention Tips," Corrosion Doctors, http://www.corrosion-doctors.org/Car/Rust-Prevention.htm, printed on May 12, 2011, six pages.

(Continued)

*Primary Examiner* — Monzer R Chorbaji
(74) *Attorney, Agent, or Firm* — Lewis Rice LLC

(57) ABSTRACT

A composition for the creation of a protective barrier on a wide variety of materials to prevent the deterioration and degradation caused by exposure to moisture and sun over time.

13 Claims, 1 Drawing Sheet

| Component | Percentage |
|---|---|
| Carnauba Wax Blend | 15 |
| 1, 2, 4 Trimethylbenzene | 3 |
| Glycerol Ester of C14, C18 Fatty Acids | 15 |
| Animal Oil (Mink) Mixed C12 to C-20 | 2 |
| Glycerol Monooleate | 14.6 |
| Bleached Tallow | 3 |
| Stoddard Solvent | 40 |
| Mineral Spirits/Naptha | 7 |
| Carbon Black 70 Dye | .4 |

(56) References Cited

OTHER PUBLICATIONS

"Corrosion Theory," Corrosion Doctors, http://www.corrosion-doctors.org/Principles/Theory.htm, printed May 12, 2011, three pages.

"How Does Rust Form," Corrosionist the Website of Corrosion and Corrosion Control, http://www.corrosionist.com/how_does_rust_form.htm, printed May 12, 2011, two pages.

"Steel Corrosion," Corrosion Doctors, http://www.corrosion-doctors.org/MatSelect/corrsteel.htm, printed on May 12, 2011, two pages.

"Cost of Corrosion," http://www.corrosioncost.com/home.html, May 2011, two pages.

Koch, Gerhardus H., "Summary—Cost of Corrosion," http://www.corrosioncost.com/summary.html, Sep. 2001, two pages.

"Corrosion Costs and Preventive Strategies in the United States," CC Technologies, Mar. 2002, Publication No. FHWA-RD-01-156, 16 pages.

"1,2,4-Trimethylbenzene," Wikipedia, http://en.wikipedia.org/wiki/1,2,4-Trimethylbenzene, last modified on Apr. 21, 2011, printed on May 12, 2011, two pages.

"Mink oil," Wikipedia, http://en.wikipedia.org/wiki/Mink_oil, last modified on Apr. 15, 2011, printed on May 12, 2011, one page.

"Carnauba wax," http://en.wikipedia.org/wiki/Carnauba_wax, last modified on Apr. 24, 2011, printed on May 12, 2011, three pages.

"Shoe polish," http://en.wikipedia.org/wiki/Shoe_polish, last modified on Mar. 21, 2011, printed on May 12, 2011, eight pages.

"Wax," http://en.wikipedia.org/wiki/Wax, last modified on May 12, 2011, printed on May 12, 2011, six pages.

"Tallow," http://en.wikipedia.org/wiki/Tallow, last modified on Mar. 27, 2011, printed on May 12, 2011, three pages.

"Carbon black," http://en.wikipedia.org/wiki/Carbon_black, last modified on Apr. 19, 2011, printed on May 12, 2011, four pages.

"Mineral spirits," http://en.wikipedia.org/wiki/Mineral_spirits, last modified on May 1, 2011, printed on May 12, 2011, two pages.

"White spirit," http://en.wikipedia.org/wiki/White_spirit, last modified on May 1, 2011, printed on May 12, 2011, three pages.

"Rust," http://en.wikipedia.org/wiki/Rust, last modified on Jun. 26, 2013, printed on Jun. 26, 2013, seven pages.

International Search Report, International Patent Application No. PCT/US13/33297, issued on Jun. 28, 2013, 12 pages.

\* cited by examiner

FIG. 1

| Component | Percentage |
|---|---|
| Carnauba Wax Blend | 15 |
| 1, 2, 4 Trimethylbenzene | 3 |
| Glycerol Ester of C14, C18 Fatty Acids | 15 |
| Animal Oil (Mink) Mixed C12 to C-20 | 2 |
| Glycerol Monooleate | 14.6 |
| Bleached Tallow | 3 |
| Stoddard Solvent | 40 |
| Mineral Spirits/Naptha | 7 |
| Carbon Black 70 Dye | .4 |

FIG. 2

| Ingredients | Percentage |
|---|---|
| Carnauba Wax Blend | 10.85% |
| 1, 2, 4 Trimethylbenzene | 2.40% |
| Glycerol Ester of C14, C18 Fatty Acids | 13.68% |
| Animal Oil (Mink) Mixed C12 to C-20 | 1.85% |
| Glycerol Monooleate | 13.50% |
| Bleached Tallow | 2.80% |
| Stoddard Solvent | 28.80% |
| Mineral Spirits/Naptha | 6.50% |
| Heavy Mineral Oil | 15.70% |
| Citrus Fragrance | 3.92% |

MOISTURE AND ULTRAVIOLET LIGHT BARRIER COMPOSITION

CROSS REFERENCE TO RELATED APPLICATION(S)

This Application incorporates by reference the entire disclosures of U.S. Provisional Patent Application Ser. No. 61/649,014, filed May 18, 2012 and U.S. Provisional Patent Application Ser. No. 61/613,731, filed Mar. 21, 2012.

BACKGROUND OF THE INVENTION

1. Field of the Invention

This disclosure is related to the field of compositions for the creation of a protective barrier against moisture and ultraviolet light.

2. Description of Related Art

Water and sun are two forces capable of wreaking havoc on a vast number of material surfaces, causing them to degrade and deteriorate with the passage of time. For example, water intrusion can enable the attack of a material or system by destructive processes such as the rotting of wood, rusting of metals and the de-lamination of plywood, amongst many other degrading processes. In addition, sun damage can result in fading and breakdown in the integrity of materials such as plastics, vinyl and rubber.

The impact of this damage over time on the economy as a whole cannot be underestimated. For example, the impact of just one of these destructive processes, rust, is immense. Rust is the general colloquial term for a series of oxides that form on iron and its alloys (such as steel) as a result of the reaction of iron and oxygen in the presence of water or moisture. Basically, when iron is in contact with water and oxygen, it rusts. Iron metal is relatively unaffected by pure water or by dry oxygen alone; the combination needs to be present for rust to form. This is because a tightly adhering oxide coating, known as a passivation layer, protects the bulk of the iron from oxidation. It is the passivating layer itself that converts to rust from exposure to the combined action of oxygen and water.

Chemically, the rusting of iron is an electrochemical process that begins with the transfer of electrons from iron to oxygen: $O_2 + 4e^- + H_2O \rightarrow 4OH^-$. From this equation, it is illustrated that the occurrence of corrosion is dictated by the availability of water and oxygen. Further, the rate of corrosion reactions can be accelerated by electrolytes (this is illustrated by the accelerating effects of road salt on rust formation in automobiles).

Because rust is basically a reaction on the passivation layer of the iron substance, the rust layer does not generally adhere or stay permanently attached to the bulk metal substance. Rather, it forms, flakes off the surface and, as it flakes, exposes fresh iron. Generally, given sufficient time, this cyclic corrosion process will continue until an iron mass will eventually convert entirely to rust and disintegrate.

It is commonly known that the corrosion of metallic structures has a significant impact on the United States economy, including infrastructure, transportation, utilities, production, manufacturing and governmental sectors. One of the pioneering benchmark studies on the cost of corrosion performed in 1975 calculated the costs to be about $70 billion per year, or about 4.2 percent of the nation's gross domestic product (GDP). A more recent study commissioned by the Federal Highway Administration (FHWA) in 2001 showed that the cost of corrosion to the overall American economy had not significantly waned in the intervening decades. The study determined the direct costs of corrosion to the United States economy to be $279 billion per year or about 3.2 percent of the United States GDP. When indirect costs (otherwise known as society costs) to the user were taken into account, the overall corrosion costs rose to about 6 percent of the GDP. Economic sectors that are commonly affected by corrosion and rust formation include, but are not limited to, infrastructure (e.g., highway bridges, gas and liquid transmission pipelines, waterways and ports, hazardous materials storage, airports and railroads), utilities (e.g., gas distribution, drinking water and sewer systems, electrical utilities and telecommunications), transportation (e.g., motor vehicles, ships, aircrafts, railroad cars, and hazardous materials transport), production and manufacturing (e.g., oil and gas exploration and production, mining, petroleum refining, chemical, petrochemical and pharmaceutical, pulp and paper, agricultural, food processing, electronics and home appliances) and government (e.g., defense and nuclear waste storage).

Thus, the economic impact of rust on infrastructure systems and the economy as a whole is large. Traditionally utilized rust prevention techniques generally include, but are not limited to, protective coatings, corrosion-resistant alloys, corrosion inhibitors, polymers, anodes, cathodic protection and corrosion control and monitoring equipment. However, despite the availability of these corrosion control methodologies, the negative impact of corrosion and rust on the United States economy keeps rising. Obviously, the presently employed strategies are not enough to win the ever-waging battle against rust. New, more effective methods to combat rust and its growing negative impact on the United States economy are therefore needed.

Similar to rust, more viable protection methodologies and solutions are also needed for other degradation and deterioration processes on a wide variety of materials (e.g., metals, wood, vinyl, plastic) that occur from exposure to moisture or sun over time. A new and effective protective composition that would act as a barrier to water and sun for these materials, protecting them for significant a significant period of time from these degrading and deteriorating processes, is therefore needed.

SUMMARY OF THE INVENTION

Because of these and other problems in the art, described herein, among other things, is a composition for the creation of a protective barrier on a wide variety of materials to prevent the deterioration and degradation caused by exposure to moisture and sun over time.

A rust inhibition prevention composition consisting essentially of a mixture of: a plant wax; and an animal oil. In one embodiment of the rust inhibition prevention composition, the plant wax comprises a carnauba wax and the animal oil comprises a mink oil. In yet another embodiment, this rust inhibition composition will further comprise a tallow. In still another embodiment, this rust inhibition prevention composition will further comprise an emulsifier. In one embodiment this emulsifier will be chosen from the group consisting of: glycerol esters of fatty acids, glycerol monooleate, Stoddard solvents, 1,2,4-trimethylbenzene, mineral spirits, and naptha. In still another embodiment, the prevention composition will further comprise a dye. In another embodiment, the prevention composition will further comprising a mineral oil. In another embodiment, the prevention composition will further comprising a fragrance.

Also disclosed herein is a prevention composition comprised of a mixture of: about 10-20% of a carnauba wax; about 1-8% of a 1,2,4 trimethylbenzene; about 10-20% of a glycerol ester of C14, C18 fatty acids; about 1-5% of a mink oil; about 10-20% of a glycerol monooleate; about 1-8% of a tallow; about 25-45% of a Stoddard solvent; about 4-12% of a mineral spirits; and about 0.2-1.5% of a dye.

Another prevention composition is comprised of a mixture of: about 10-20% of a carnauba wax; about 1-8% of a 1,2,4 trimethylbenzene; about 15-30% of a glycerol ester of C14, C18 fatty acids; about 1-5% of a mink oil; about 15-25% of a glycerol monooleate; about 1-8% of a tallow; about 35-45% of a Stoddard solvent; about 4-12% of a mineral spirits; about 2-7% of a mineral oil; about 2-5% of a fragrance (such as citrus); and about 0.2-1.5% of a dye.

Yet another prevention composition is comprised of a mixture of: about 10-20% of a carnauba wax; about 1-8% of a 1,2,4 trimethylbenzene; about 15-30% of a glycerol ester of C14, C18 fatty acids; about 1-5% of a mink oil; about 10-20% of a glycerol monooleate; about 1-8% of a tallow; about 35-45% of a Stoddard solvent; about 2-7% of a mineral spirits; about 4-12% of a mineral oil; and about 1-2% of a fragrance (such as citrus).

Also disclosed herein is a prevention composition comprised of a mixture of: about 10-20% of a carnauba wax; about 1-8% of a 1,2,4 trimethylbenzene; about 15-30% of a glycerol ester of C14, C18 fatty acids; about 1-5% of a mink oil; about 20-30% of a glycerol monooleate; about 1-8% of a tallow; about 35-45% of a Stoddard solvent; about 4-12% of a mineral spirits; and about 0.2-1.5% of a Carbon Black 70 dye.

Still another prevention composition disclosed herein consists of: about 10.85% of a carnauba wax; about 2.40% of a 1,2,4 trimethylbenzene; about 13.68% of a glycerol ester C14, C18 fatty acids; about 1.85% of a mink oil; about 13.5% of a glycerol monooleate; about 2.8% of a tallow; about 28.8% of a Stoddard solvent; about 6.5% of a mineral spirits; about 15.7% of a mineral oil; and about 3.92% of a fragrance.

In yet another embodiment, the prevention composition will consist of: about 10.85% of a carnauba wax; about 2.40% of a 1,2,4 trimethylbenzene; about 13.68% of a glycerol ester of C14, C18 fatty acids; about 1.85% of a mink oil; about 13.5% of a glycerol monooleate; about 2.8% of a tallow; about 28.8% of a Stoddard solvent; about 6.5% of a mineral spirits; about 15.7% of a mineral oil; and about 3.92% of a citrus fragrance.

Also disclosed herein is a method for applying a rust inhibition composition to a surface of an object to be treated, the method comprising: heating the surface of the object to be treated to a temperature warm enough to melt or liquefy the rust inhibition composition on contact; applying the rust inhibition composition to the surface of the object to be treated, keeping the surface warm during the applying; and cooling the surface of the object to be treated back to room temperature after the step of applying. In one embodiment of this method, in the step of heating, the surface of the object to be treated will be heated to about 100° F.-140° F. In another embodiment of this method, in the step of heating, the surface of the object to be treated will be heated to about 120° F.

BRIEF DESCRIPTION OF THE DRAWINGS

FIG. 1 provides a chart of the raw materials of an embodiment of the moisture and ultraviolet light barrier composition.

FIG. 2 provides a chart of the raw materials of an alternative embodiment of the moisture and ultraviolet light barrier composition.

DESCRIPTION OF THE PREFERRED EMBODIMENT(S)

This disclosure is intended to teach by way of example and not by way of limitation. The present disclosure focuses on a formulation for a composition which functions as a protective barrier against moisture, ultraviolet rays, stains, deposits, rust and fingerprints and other known deteriorating or degrading processes or substances known to those of ordinary skill in the art for a wide variety of materials. In one embodiment, this composition, in a simplified form, is comprised of a combination of waxes and water repellants. Also discussed herein are methods for the production of such compositions, along with various alternative methods of using such compounds in the prevention of water and sun deterioration or other known degrading processes on a wide variety of materials and products.

As noted previously, in its most general format, the composition disclosed herein is comprised of a combination of waxes and water repellants formed into a mixture. Any type of organic compound with a long alkyl chain that is malleable near ambient temperatures and is commonly known to those of skill in the art as a "wax" is contemplated as a wax component of the disclosed composition. Contemplated waxes include, but are not limited to: plant and animal waxes such as shellac wax, castor wax, carnauba wax and soy wax, petroleum waxes such as paraffin wax, mineral waxes such as ceresin wax, and synthetic waxes such as polyethylene wax. In certain embodiments, the contemplated wax in the composition is a shoe polish wax blend. Generally, any waxy colloidal emulsion shoe polish comprised of some or all of naptha, lanolin, turpentine, wax, gum Arabic, ethylene glycol and a colorant is contemplated. In preferred embodiments, the contemplated wax shoe polish will be comprised of carnauba wax. Commercial examples of contemplated shoe polish blends include, but are not limited to, Club Classic® paste polish, a carnauba wax blend. Further, organic water repellents are also contemplated as components in the disclosed composition. Generally, any organic water repellant known to those of ordinary skill in the art is contemplated as an organic water repellant component of the disclosed composition. Contemplated organic water repellents include animal oils, such as mink oil, and common alternatives thereto known to those of ordinary skill in the art (e.g., macadamia nut oil and sea buckthorn oil). However, it should be noted that, in certain embodiments, commercial water repellents could also be utilized.

While the invention is not intended to be limited to any effect of the modality of the deterioration and degradation prevention composition, it is hypothesized that one explanation for the effectiveness of this composition in preventing the deterioration and degradation caused over time by water and sun in addition to its ability to protect surfaces from stains and oily deposits is that the water repellant qualities of the wax and water repellent blend impede the water or moisture necessary for deterioration and degradation to occur from coming into contact with the surface area of a treated material. Further, the barrier formed by application of the composition on the material can also act as a barrier to ultraviolet rays, preventing these rays from coming into direct contact with the material, which direct contact results in a breakdown of the material over time.

In one embodiment of the disclosed prevention composition, the composition comprises: carnauba wax and mink oil. In another embodiment of the disclosed prevention composition, the composition consists of: carnauba wax and mink oil. In yet another embodiment of the disclosed composition, the composition consists essentially of: a plant wax and animal oil. In still another embodiment of the disclosed composition, the composition consists essentially of: a palm wax and an animal oil. In another embodiment of the disclosed composition, the composition consists essentially of: a carnauba wax and mink oil. In yet another embodiment of the disclosed composition, the composition consists essentially of: carnauba wax blend and mink oil. In more complex embodiments of the disclosed composition, the composition is further comprised of tallow such as, but not limited to, bleached tallow. This further component adds, amongst other properties, lubrication properties to the resultant composition.

In another embodiment, the composition is further comprised of certain emulsifiers and solvents known to those of ordinary skill in the art. Contemplated emulsifiers and solvents include, but are not limited to, glycerol esters of fatty acids, glycerol monooleate, Stoddard solvents, 1,2,4-trimethylbenzene, mineral spirits, and naptha. However, it should be noted that this list is not exclusive, as any emulsifier or solvent known to those of ordinary skill in the art is contemplated as a possible component of the disclosed composition. Further, in another embodiment, the disclosed composition is further comprised of a dye known to those of ordinary skill in the art that is compatible with silicon and wax type materials such as, but not limited to, carbon black. Notably, the color of the dye is not determinative; the color of the dye can vary depending upon how and upon what material the composition will be utilized. In one embodiment where the dye is black, the resultant composition will be black. In yet another embodiment, the composition will be further comprised of a mineral oil known to those of ordinary skill in the art and a contemplated fragrance. Contemplated fragrances include, but are not limited to, fruit, plant, flower and freshener scents known to those of ordinary skill in the art.

Generally, contemplated ranges for certain components of the composition in various different embodiments are as follows: about 10-20% carnauba wax blend; about 1-8% 1,2,4 trimethylbenzene; about 10-20% glycerol ester of C14, C18 fatty acids; about 1-5% of mink oil; about 10-20% glycerol monooleate; about 1-8% tallow; about 25-45% Stoddard solvent; about 4-12% mineral spirits/naptha; and about 0.2-1.5% carbon black dye. In a preferred embodiment of the composition, the specific percentages of the components are as follows: about 15% carnauba wax; about 3% 1,2,4 trimethylbenzene; about 15% glycerol ester of C14, C18 fatty acids; about 2% of mink oil; about 14.6% glycerol monooleate; about 3% tallow; about 40% Stoddard solvent; about 7% mineral spirits/naptha; and about 0.4% carbon black dye. FIG. 1 provides a chart of the raw materials of an embodiment of this specific preferred embodiment of the disclosed prevention composition. Notably, however, in no way is this listing of ranges and specific percentages intended to be exhaustive, as other ranges could be contemplated in additional embodiments of the composition.

In an alternative embodiment of the prevention and inhibition composition, generally for use in the home-goods industry amongst other applications, the specific percentages of the components are as follows: about 10.85% carnauba wax blend; about 2.40% 1,2,4 trimethylbenzene; about 13.68% glycerol ester of C14, C18 fatty acids; about 1.85% mink oil; about 13.5% glycerol monooleate; about 2.8% tallow; about 28.8% Stoddard solvent; about 6.5% mineral spirits/naptha; about 15.7% mineral oil; and about 3.92% citrus fragrance.

Generally, the prevention and inhibition composition disclosed herein may take any form known to those of ordinary skill in the art now or in the future for protective barriers and prevention coatings or inhibitors including, but not limited to: a cream, a paste, a solution, a liquid, a lotion, an ointment and/or a gel.

In certain embodiments, the prevention and inhibition composition will be applied as follows. First, the surface of the object to be treated will be heated to a temperature warm enough to melt or liquefy the rust prevention and inhibition composition on contact. In one embodiment, this will be about 100° F.-140° F., preferably about 120° F. Then, the prevention and inhibition composition will be added to the surface of the object to be treated, keeping the surface warm during the application. In one embodiment, this application will occur with a soft-bristle brush. Once the application is complete, the treated object will be allowed to cool back to normal room temperature. In other modes of application, the surface of the object to be treated will not be heated; the composition will simply be applied by another methodology known to those of ordinary skill in the art that does not require a preheating of the material surface (e.g., spreading, brushing, spraying, etc. to a room temperature surface).

In other embodiments, in particular for the embodiment of the prevention and inhibition composition for the home-goods industry, the composition is applied to the desired surface with a soft cloth, paper towel, sponge, brush or other application mechanism known to those of ordinary skill in the art. After application, the desired surface will be wiped or buffed clean. This application process can be repeated as needed. Desired surfaces for application include, but are not limited to, stainless steel, glass, leather, vinyl, cardboard, copper, sterling silver, fiberglass, aluminum and brass.

In one embodiment, the disclosed prevention composition is created by the following process. In a first step, the carnauba wax blend, 1,2,4 trimethylbenzene, glycerol ester of C14-C18 fatty acid, mink oil, glycerol monooleate, bleached tallow, Stoddard solvent, mineral spirits/naptha and carbon black dye are all heated by a method known to those of ordinary skill in the art until they liquefy. In one embodiment of this first step, the carnauba wax will be liquefied by placing a quantity of the carnauba wax (such as 5 gallons) into a heating mechanism (such as a heat box) which is heated to a temperature of about 175° F. for about 5-6 hours. In another embodiment of this first step, the 1,2,4 trimethylbenzene, glycerol ester of C14-C18 fatty acid, mink oil, glycerol monooleate, bleached tallow, Stoddard solvent, mineral spirits/naptha and carbon black dye will all be placed into a heating mechanism known to those of ordinary skill in the art (such as an oven) which is heated to about 140° F.-145° F.

In a second step, a container is heated to about 140° F.-200° F., in a preferred embodiment to about 175° F. Generally, any container or heating mechanism known to those of ordinary skill in the art is contemplated. In one embodiment, an aluminum or stainless steel container is utilized. In another embodiment, the container is heated to the applicable temperature by placing the container over heated coils. In a third step, the carnauba wax is added to the pre-heated container. In this step, the carnauba wax is maintained at a temperature within the range of about 140° F.-200° F., preferably about 175° F. for a period of about 30 minutes. In one embodiment of this step, the carnauba wax will be stirred by a stirring mechanism known to those of ordinary skill in the art at regular time intervals, in one embodiment at three (3) minute time intervals.

In a fourth step, the glycerol monooleate, Stoddard solvent, mineral spirits and naptha will be added to the carnauba wax and the temperature of the mixture will be maintained at within the range of about 140° F.-200° F., preferably about 175° F. for a period of about 3-5 minutes. In one embodiment of this step, the mixture will be stirred by a stirring mechanism known to those of ordinary skill in the art for a certain time period, in one embodiment for about 30 seconds. In a fifth step, the carbon black dye is added to the mixture. In one embodiment of this step, the mixture will be stirred by a stirring mechanism known to those of ordinary skill in the art for a certain time period, in one embodiment for about 1-2 minutes.

In a sixth step, the mixture will be maintained at a temperature within the range of about 140° F.-200° F., preferably about 175° F. for a certain time period. In a preferred embodiment, the mixture will be maintained at a temperature within the range of about 140° F.-200° F., preferably about 175° F. for about five (5) minutes. At the end of this allocated time period, in a seventh step, the mixture will be stirred by a stirring mechanism known to those of ordinary skill in the art.

In an eighth step, the resultant mixture will be dispensed and allowed to cool and cure to room temperature by methods known to those of ordinary skill in the art. In one embodiment of the disclosed process, about 640 ounces of the carnauba wax; about 31.60 ounces of animal oil; about 31.60 ounces of trimethylbenzene, Stoddard solvent and naptha (equal parts combined and about 2.25 ounces of carbon black 70 dye) will be utilized.

In the alternative embodiment of the prevention composition for the home-goods industry, another contemplated method for creating the composition is as follows. First, the carnuba wax, trimethylbenzene and Stoddard solvent are combined and heated to about 175° F. In a second step, the glycerol esters, animal oil, glycerol monooleate and bleached tallow are heated separately from the first combination to about 140° F. In a third step, the second combination is added to the first combination. In a fourth step, the mineral spirits are heated to about 140° F. and added to the mix. In a fifth step, the mineral oil is added and mixed. In a sixth step, the fragrance is added. In a seventh step, the mixture is heated to about 170° F. and stirred for about 5 minutes. In a final step, the resultant mixture is dispensed and allowed to cool and cure to room temperature by methods known to those of ordinary skill in the art.

The advantages of the disclosed prevention composition are its ability to act as a protective barrier against moisture and ultraviolet rays for the material upon which it is applied, thereby inhibiting and preventing the deterioration and degradation caused by these elements over time, even in extreme conditions.

For example, preliminary testing has shown that the disclosed composition has the ability to prevent the formation of rust in numerous extreme conditions including thermal shock conditions, 1000 hour salt fog (60% solution) conditions, acid exposure conditions, abrasive testing conditions, and salt spray (92% solution) conditions. In each of the preliminary testing environments, the disclosed composition was applied to a steel tie rod end followed by an adequate cure time known to those of ordinary skill in the art. Following the cure period, the treated rod was exposed to each of the preliminary testing environments as follows:

Thermal Shock Test

In the thermal shock test, a treated rod was exposed to extreme temperatures within the range of about −140° F. to 135° F. for about 10 hours. Specifically, in this test the component was heated to 135° F. and then the temperature was cycled to about −140° F. at various intervals, ranging from about 5 minutes to about 1 hour. This cyclic temperature change was repeated for about 10 hours. The completion of the 10 hour thermal shock test revealed no measurable degree of deterioration, corrosion or discoloration of the treated rod. In this test, the composition provided 100% durability.

1000 Hour Salt Fog (60% Solution) Test

In the salt fog test, a treated rod was exposed to about a 60% salt solution for about 1000 hours. Specifically, in this test the component was placed in a salt fog chamber for about 1000 hours and exposed to a 60% salt solution. After the completion of the test, the treated rod was removed and inspected visually and with a magnifying scope. The inspection revealed no measurable degree of deterioration, discoloring, corrosion, or degradation to the coating or the treated rod. Thus, the prevention composition provided remarkable protection and corrosion resistance, providing 100% corrosion protection and durability.

Acid Exposure Test

In the acid exposure test, a treated rod was exposed to a hydrochloric acid solution for about ½ hour. Specifically, in this test the treated rod was placed in a sealed chamber and exposed to a diluted solution of 38% hydrochloric acid. As known to those of ordinary skill in the art, a diluted solution of hydrochloric acid will quickly rust mild steel components. The treated rod was then exposed to an intermittent spray of the diluted acid solution for about ½ hour. Upon completion of the test, the treated rod was removed for inspection. The inspection revealed no measurable degree of deterioration, discoloring or corrosion; the prevention composition had provided 100% protection and durability. Further, the inspection revealed that the acid solution remained on the surface of the treated rod without any measurable penetration of the coating of the disclosed prevention composition.

Abrasive (Impact) Test

In the abrasive (impact) test, a treated rod was exposed to simulated abrasive materials for about an hour. In this test, the treated rod was placed in a sealed chamber and exposed to a variety of different materials including but not limited to ground glass, sand and rock for about an hour. The abrasive materials were generally applied to the treated rod at about 30 psi from a distance of about 17 mm. After-testing inspection revealed that the treated rod was not damaged during the testing, no visible signs of damage or pitting were evident in the coating of the prevention material or on the rod. In sum, the treated rod showed 100% durability in this test.

Salt Spray Test (92% Solution)

In the salt spray test, a treated rod was exposed to a salt spray solution which contained about 92% brine solution for about 60 hours at about 15 psi spray pressure and about 60 percent humidity. Notably, this is an extremely high solution of salt saturation. Specifically, in the test the treated rod was placed in a salt spray container containing about a 92% Brine solution. The treated rod was exposed to the 92% solution for about 60 hours with a 15 psi spray pressure during the test. An inspection following the test revealed no measurable degree of deterioration, discoloring or corrosion. The 92% salt spray (a highly concentrated solution with properties that will quickly corrode metal) test revealed that the prevention composition provided excellent protection from the corrosive effects of the testing solution; 100% protection and durability was demonstrated upon inspection.

In sum, these preliminary test results reveal the remarkable protection and durability from moisture provided to iron and iron alloys by the prevention composition disclosed herein. This same protection from the damage caused by moisture and sunlight is also believed provided to other materials upon which the composition is applied including but not limited to metals (e.g., stainless steel, iron, aluminum, precious metals, etc.), plastics, vinyl, wood, rubber and any other materials that are at risk for deterioration and degradation from exposure to moisture and ultraviolet rays over time. Further, the disclosed composition can also be utilized for other useful functions to prevent certain moistures, oils or other substances from coming into contact with treated materials. The prevention of fingerprints and smudges on stainless steel coated with the disclosed composition is one such example.

The prevention of deterioration from acid rain on treated metals and other materials is another example.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A method for applying a rust inhibition composition to a surface of an inorganic object to be treated, the method comprising:
    providing a rust inhibition prevention composition consisting essentially of a mixture of:
        a plant wax; and
        an animal oil;
    heating the surface of the inorganic object to be treated to a temperature warm enough to melt or liquefy the rust inhibition composition on contact;
    applying the rust inhibition composition to the heated surface of the inorganic object to be treated, keeping the surface warm during the applying; and
    cooling the surface of the inorganic object to be treated back to room temperature after the step of applying.

2. The method of claim 1, wherein in the step of heating the surface of the inorganic object to be treated will be heated to about 100° F.-140° F.

3. The method of claim 1, wherein in the step of heating the surface of the inorganic object to be treated will be heated to about 120° F.

4. The method of claim 1, wherein the plant wax comprises a carnauba wax and the animal oil comprises a mink oil.

5. The method of claim 4, wherein the rust inhibition composition further comprises a tallow.

6. The method of claim 4, wherein the rust inhibition composition further comprises an emulsifier.

7. The method of claim 4, wherein the rust inhibition composition further comprises an emulsifier chosen from the group consisting of: glycerol esters of fatty acids, glycerol monooleate, stoddard solvents, 1,2,4-trimethylbenzene, mineral spirits, and naptha.

8. The method of claim 4, wherein the rust inhibition composition further comprises an emulsifier and a dye.

9. The method for applying a rust inhibition composition to the surface of an inorganic object disclosed in claim 4, wherein the rust inhibition composition further comprises an emulsifier, a dye, and mineral oil.

10. The method for applying a rust inhibition composition to the surface of an inorganic object disclosed in claim 4, wherein the rust inhibition composition further comprises an emulsifier, a dye, mineral oil, and a fragrance.

11. A method for applying a rust inhibition composition to a surface of an inorganic object to be treated, the method comprising:
    heating the surface of the inorganic object to be treated to a temperature warm enough to melt or liquefy the rust inhibition composition on contact;
    applying the rust inhibition composition to the heated surface of the inorganic object to be treated, keeping the surface warm during the applying; and
    cooling the surface of the inorganic object to be treated back to room temperature after the step of applying;
    wherein the rust inhibition prevention composition comprises of a mixture of:
        about 10-20% of a carnauba wax;
        about 1-8% of a 1,2,4 trimethylbenzene;
        about 10-20% of a glycerol ester of C14, C18 fatty acids;
        about 1-5% of a mink oil;
        about 10-20% of a glycerol monooleate;
        about 1-8% of a tallow;
        about 25-45% of a Stoddard solvent;
        about 4-12% of a mineral spirits; and
        about 0.2-1.5% of a dye.

12. The method of claim 11, wherein the rust inhibition composition comprises:
    about 10.85% of a carnauba wax;
    about 2.40% of a 1,2,4 trimethylbenzene;
    about 13.68% of a glycerol ester C14, C18 fatty acids;
    about 1.85% of a mink oil;
    about 13.5% of a glycerol monooleate;
    about 2.8% of a tallow;
    about 28.8% of a Stoddard solvent;
    about 6.5% of a mineral spirits;
    about 15.7% of a mineral oil; and
    about 3.92% of a fragrance.

13. The rust inhibition of claim 12 wherein the rust inhibition composition consists of:
    about 10.85% of a carnauba wax;
    about 2.40% of a 1,2,4 trimethylbenzene;
    about 13.68% of a glycerol ester of C14, C18 fatty acids;
    about 1.85% of a mink oil;
    about 13.5% of a glycerol monooleate;
    about 2.8% of a tallow;
    about 28.8% of a Stoddard solvent;
    about 6.5% of a mineral spirits;
    about 15.7% of a mineral oil; and
    about 3.92% of a citrus fragrance.

* * * * *